United States Patent [19]

Tumlin

[11] Patent Number: 4,896,797
[45] Date of Patent: Jan. 30, 1990

[54] SEED STICK

[76] Inventor: Bruce A. Tumlin, Route One, Box 289C, Hayden, Ala. 35079

[21] Appl. No.: 299,555

[22] Filed: Jan. 17, 1989

[51] Int. Cl.⁴ ............................................. B65D 5/42
[52] U.S. Cl. .................................... 222/175; 222/129; 222/309; 222/501; 222/508; 222/518; 111/95
[58] Field of Search ................... 111/95, 96; 222/129, 222/145, 309, 501, 508, 518, 559, 613, 174, 175, 505, 507, 517; 221/185, 190, 199

[56] References Cited

U.S. PATENT DOCUMENTS

| 151,811 | 6/1874 | Valentine | 222/508 |
|---|---|---|---|
| 1,555,176 | 9/1925 | Allen | 222/508 |
| 2,182,878 | 12/1939 | Pipenhagen | 222/501 |
| 2,515,269 | 7/1950 | Shaw | 222/129 |
| 2,566,429 | 9/1951 | Schulman | 222/501 |
| 3,565,298 | 2/1971 | Ohlin et al. | 222/309 |
| 3,847,312 | 11/1974 | Marr et al. | 222/501 |
| 4,206,714 | 6/1980 | Walsh | 111/95 |
| 4,485,939 | 12/1984 | Gafford et al. | 222/129 |
| 4,811,869 | 3/1989 | Tremblay | 222/501 |

Primary Examiner—Kevin P. Shaver
Assistant Examiner—Steven Reiss

[57] ABSTRACT

A manually operated seeder and gardening device has a storage hopper for seeds with a pressure activated valve therein to permit the passage of seed from the storage hopper onto the desired location. The arrangements of parts and relative sizes is such as to meter the seed to be deposited. An optional insert traversing the length of the hopper to allow for depositing of a growth aid at the moment of seed expulsion.

5 Claims, 1 Drawing Sheet

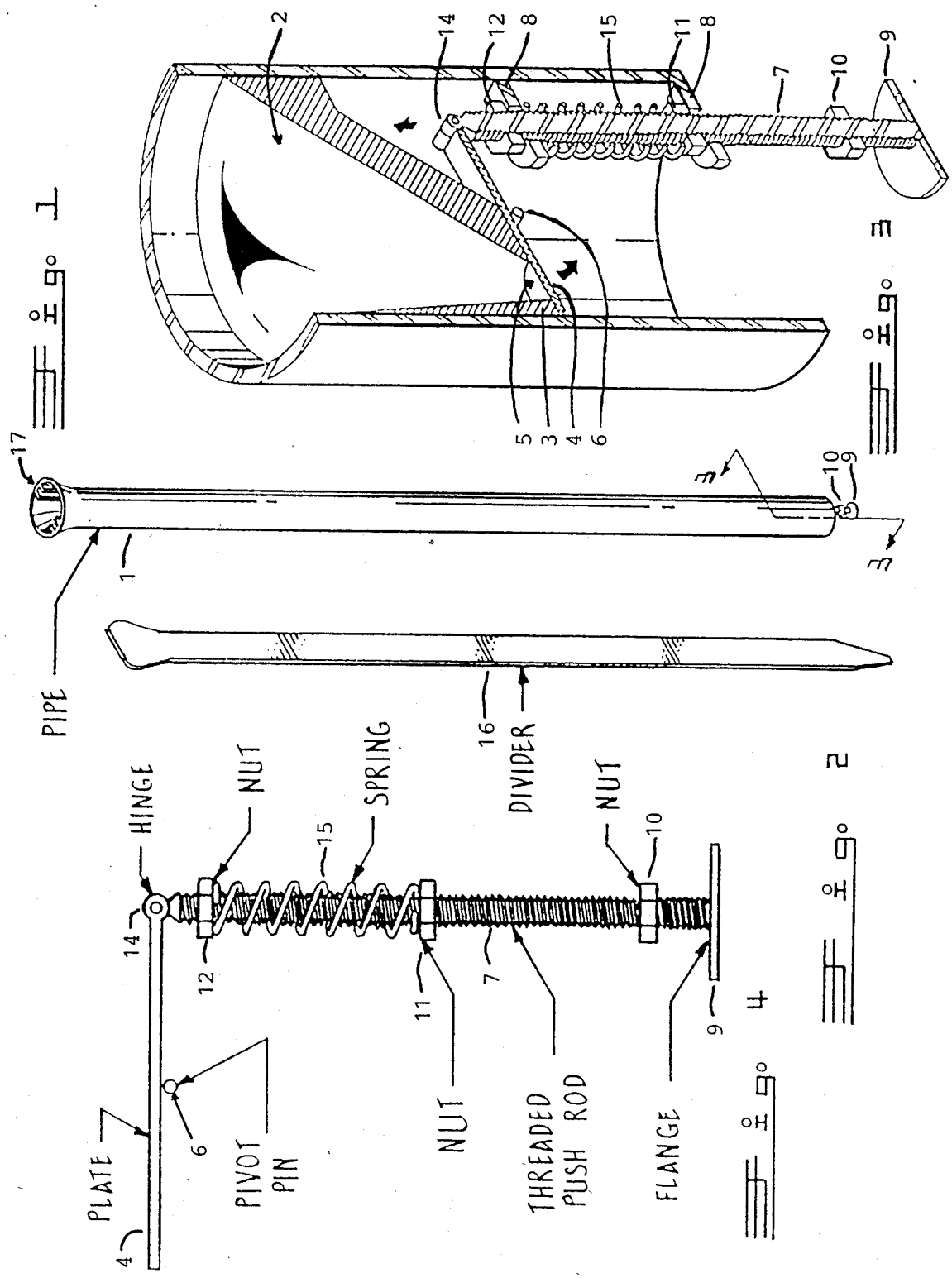

SEED STICK

SUMMARY OF INVENTION

This invention relates to a hand-held garden and field seeder designed to deliver crop seeds to the exact desired location in a faster and simpler way than has heretofore been available to the individual who plants crops manually.

One of the more laborious phases of gardening or crop farming involves putting seeds into the ground. The seeding process essentially involves the use of a soil cultivator to form the earth into rows, placing a predetermined quantity of seed and fertilizer in the rows, and then refilling the rows with soil. The seeding process is usually done in either one of two ways: (1) By holding a container of seed in one hand while counting and dropping the seed from waist height with the other or (2) by the same described manner except utilizing a pipe with a funnel attachment at the top. The latter method is used to direct the seed to the exact desired spot. Both methods are quite slow and cumbersome. This invention provides the unique function of combining the above mentioned planting procedures into one fast and efficient movement. This invention may be largely constructed of a plastic material such as Polyester or Polyvinyl Chloride. The use of a light, yet durable, plastic would enable the manufacturer to easily make minor modifications to the invention, without changing the scope, to accommodate the needs of the consumer. For example, the circumference of the seed holding tube could be made slightly larger for those who have larger gardens or fields. This invention consists of fewer moving parts than other such devices, greatly reducing the risk of any one part malfunctioning.

One of the objects of the present invention is to provide a simple, yet effective, garden or field seeder device.

Another object of the present invention is to provide a manually operated seeder device which is light in weight, simple in construction, and easy to operate.

Another object of the present invention is to provide a means of allowing a determined amount of seed to drop from the end of this device when it is pressed against the earth.

Another object of the present invention is for the user to possess the ability to drop seed at a specific place thus reducing the overuse of seed and improving the growth pattern of the garden or field.

A further object of this device is for the user to possess the ability to dispense a growth aid, such as fertilizer, at the same instant that the seed are dropped by the use of an optional insert designed to divide the two substances into equal portions.

REFERENCE TO DRAWINGS

These and other objects and features of the invention will be better understood from the following detailed description, reference being taken to the accompanying drawing in which:

FIG. 1 is a perspective view of the invention.

FIG. 2 is a perspective view of the insert designed to slip into guides along the inside length of the invention.

FIG. 3 is a cross-sectional view taken through line 3—3 of FIG. 1, which depicts the operating structure.

FIG. 4 is a detailed view of the active component during use, which allows for the dispersing process.

As can be seen in FIG. 1, the device consists of a pipe that measures approx. 4½ feet in length. It's diameter is approx. 2 inches, but the upper end may be flared to allow for easy placement of seed or other material into it. The pipe 1 is filled with seed which rest on an inclined ramp 2 that reduces the size of the pipe to a much narrower opening. A small protrusion 3 from the opposite side of the pipe is present at the opening and decreases it's size also. Attached to the bottom of the inclined plane 2 is a flat plate 4 that is designed to cover the opening 5. The plate 4 will pivot on the bottom surface of the ramp 2 by the placement of a pin 6 beneath it. When the end away from the opening 5 in the pipe 1 is pressed upward, the other end pivots downward to allow passage of the seed. In this sense, the plate acts exactly as a valve that allows a metered amount of seed to pass when opened. The pivoting motion of the plate is caused by a threaded push rod 7 that is placed in a position that is parallel to the sides of the pipe 1 and accordingly perpendicular to the plane of the plate 4. The length of the push rod 7 is dependent on the height of the components discussed above. This component, however, passes through two guides 8 attached to the inside wall of the pipe 1 to allow for a smooth up and down motion of the push rod 7. On the push rod 7 itself are mounted various elements. These include a flange 9 at the bottom that is flat and perhaps ¾ of an inch wide. Above the flange 9 are three adjusting nuts spaced out so that one 10 is below the lower guide 8, one 11 is positioned between the guides 8 (very near the lower one), and one 12 is between the upper end of the push rod 7 and the upper guide 8. The upper end of the push rod 7 (opposite end of the flange 9) is attached to the plate 4 by a hinge 14. A spring 15 surrounds the push rod 7 in the area between the guides 8. Finally, a divider 16, with the lower end tapered and the upper end flanged may be inserted into the tracts 17 to allow for separation of materials when desired.

OPERATION

As the flange 9 presses against the earth and forces the rod 7 upward, the pivoting plate opens and seed passes through the opening at the end of the inclined plane 2. The amount of seed dropped depends on the duration that the push rod 7 is in the lift position and the position of the adjustment nut 10, which determines the size of the opening 5. Accomodations can easily be made for different size seed by moving the lower adjustment nut 10 up or down the threaded push rod 7. Ideally, the upper two adjustment nuts 11 and 12 should never require moving, thus the area of the push rod 7 covered by the spring 15 may be of a smooth surface to allow for smoother operation. At the same time, the spring 15 has been compressed between the center adjusting nut 11 and the upper guide 8. As the pressure on the flange 9 is reduced by lifting the entire device away from the earth, the spring 15 expands, stopping the passage of seed and returning the flange 9 to it's original position.

I claim:

1. A manually operable seeder device or the like comprising:
    an elongated, tubular storage hopper including a funneling member fixedly mounted off center within the lower end thereof, and having a lower opening, a swing check valve assembly affixed within the lower portion of said hopper and directly beneath said funneling member, said swing check valve including a flat plate member being in communication with said funneling member, said plate member having a first portion on one side of a fulcrum pin and covering said lower opening, and a second portion on the other side of the fulcrum pin, said plate member being pivotally secured to the hopper by the fulcrum pin, which extends diametrically across the chamber of said hopper, said second portion of said plate member being hinged at its extreme edge opposite said fulcrum pin to the end of a threaded push-rod, said push-rod being parallel to the interior wall of lowest portion of said hopper and perpendicular to the plane of said plate, said push-rod being slidably connected to said interior wall by fixedly mounted guides, said swing check valve further including a single coil spring means surrounding said push-rod, said spring means operable to bias said push-rod wherein said plate covers and seals said funnel member lower opening to retain said valve closed, said push-rod further extending beyond the lower end of said hopper, and said check valve opens by said first portion of the plate member swinging downwardly and away from said lower opening when the threaded rod moves relative to the storage hopper.

2. A manually operable seeder device as in claim 1 wherein said storage hopper includes vertical tracks paralleling interior walls of said hopper for receiving an optional chamber dividing insert for separating substances.

3. A manually operable seeder device as in claim 1 wherein said push-rod includes a flange member at the extreme point extending beyond the lower end of said hopper for contact with the earth.

4. A manually operable seeder device as in claim 1 wherein said guides allow for vertical movement of said push-rod and further limit the extent of relative sliding movement of said push-rod.

5. A manually operable seeder device as in claim 1 wherein said push-rod includes threaded nuts thereon to limit the extent of relative sliding movement of said push-rod when in communication with said guides.

* * * * *